United States Patent
Kim et al.

(10) Patent No.: US 10,306,604 B2
(45) Date of Patent: May 28, 2019

(54) METHOD FOR ACQUIRING SYSTEM FRAME NUMBER BY TERMINAL, TERMINAL, AND MOBILE COMMUNICATION SYSTEM

(71) Applicant: Samsung Electronics Co., Ltd., Suwon-si, Gyeonggi-do (KR)

(72) Inventors: Sangbum Kim, Suwon-si (KR); Soenghun Kim, Suwon-si (KR); Kyeongin Jeong, Yongin-si (KR); Gert Jan Van Lieshout, Apeldoorn (NL); Himke Van Der Velde, Zwolle (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 335 days.

(21) Appl. No.: 14/760,386

(22) PCT Filed: Nov. 3, 2014

(86) PCT No.: PCT/KR2014/010412
§ 371 (c)(1),
(2) Date: Jul. 10, 2015

(87) PCT Pub. No.: WO2015/065128
PCT Pub. Date: May 7, 2015

(65) Prior Publication Data
US 2015/0358957 A1    Dec. 10, 2015

(30) Foreign Application Priority Data
Nov. 1, 2013    (KR) .................. 10-2013-0132572

(51) Int. Cl.
*H04W 72/04*    (2009.01)
*H04W 48/08*    (2009.01)
(Continued)

(52) U.S. Cl.
CPC ....... *H04W 72/0413* (2013.01); *H04L 5/0058* (2013.01); *H04W 48/08* (2013.01);
(Continued)

(58) Field of Classification Search
CPC ............... H04W 72/042; H04W 16/32; H04W 72/0413; H04W 56/001; H04W 36/0088; H04W 4/08
(Continued)

(56) References Cited

U.S. PATENT DOCUMENTS

| | | |
|---|---|---|
| 8,249,091 B2 | 8/2012 | Kim et al. |
| 2009/0274086 A1* | 11/2009 | Petrovic ............... H04J 11/0093 370/312 |

(Continued)

FOREIGN PATENT DOCUMENTS

| | | |
|---|---|---|
| CN | 102104413 A | 6/2011 |
| CN | 102196518 A | 9/2011 |

(Continued)

OTHER PUBLICATIONS

NTT DOCOMO, Inc.; SFN and subframe/slot number alignment for CA; 3GPP TSG-RAN2#70bis; R2-103957; Jun. 28-Jul. 2, 2010; Stockholm, Sweden.

(Continued)

*Primary Examiner* — Jaime M Holliday
(74) *Attorney, Agent, or Firm* — Jefferson IP Law, LLP

(57) ABSTRACT

A System Frame Number (SFN) acquisition method is provided. The System Frame Number (SFN) acquisition method of a terminal according to the present invention includes receiving a first message for adding a secondary cell of a secondary base station from a primary cell of a primary base station, receiving a Master Information Block (MIB) broadcast in the secondary cell, and acquiring a SFN information for the secondary cell from the MIB, and (Continued)

applying the SFN information to at least one cell of the secondary base station.

22 Claims, 15 Drawing Sheets

(51) Int. Cl.
| | |
|---|---|
| *H04L 5/00* | (2006.01) |
| *H04W 84/04* | (2009.01) |
| *H04W 88/12* | (2009.01) |
| *H04W 4/08* | (2009.01) |
| *H04W 56/00* | (2009.01) |
| *H04W 36/00* | (2009.01) |
| *H04W 16/32* | (2009.01) |
| *H04W 48/02* | (2009.01) |
| *H04W 48/20* | (2009.01) |

(52) U.S. Cl.
CPC .............. *H04W 4/08* (2013.01); *H04W 16/32* (2013.01); *H04W 36/0069* (2018.08); *H04W 36/0088* (2013.01); *H04W 48/02* (2013.01); *H04W 48/20* (2013.01); *H04W 56/001* (2013.01); *H04W 72/042* (2013.01); *H04W 84/042* (2013.01); *H04W 84/045* (2013.01); *H04W 88/12* (2013.01)

(58) Field of Classification Search
USPC ...... 455/432.1, 435.1, 435.2, 446, 448, 449, 455/434
See application file for complete search history.

(56) References Cited

U.S. PATENT DOCUMENTS

| | | | | |
|---|---|---|---|---|
| 2012/0113843 | A1* | 5/2012 | Watfa | H04W 72/1289 370/252 |
| 2013/0053103 | A1 | 2/2013 | Kim et al. | |
| 2013/0155898 | A1* | 6/2013 | Yin | H04L 1/0026 370/254 |
| 2013/0210439 | A1* | 8/2013 | Bae | H04W 36/0083 455/436 |
| 2014/0010139 | A1* | 1/2014 | Choi | H04W 4/06 370/312 |
| 2014/0051426 | A1* | 2/2014 | Siomina | H04W 36/0088 455/422.1 |
| 2015/0099501 | A1 | 4/2015 | Kim et al. | |
| 2015/0304925 | A1* | 10/2015 | Hwang | H04L 5/00 370/331 |
| 2016/0192269 | A1* | 6/2016 | Kim | H04W 36/30 370/332 |

FOREIGN PATENT DOCUMENTS

| | | |
|---|---|---|
| CN | 104412532 A | 3/2015 |
| EP | 2 849 359 A1 | 3/2015 |
| KR | 10-2011-0034827 A | 4/2011 |
| WO | 2012/011789 A2 | 1/2012 |
| WO | 2012/144731 A2 | 10/2012 |
| WO | 2013/027952 A2 | 2/2013 |

OTHER PUBLICATIONS

Samsung; Views on weak pico detection and acquistion in FeICIC; 3GPP TSG-RAN2#79 meeting; Tdoc R2-123577; Aug. 12-18, 2012; Qingdao, China.
Samsung; How to provide System information in Dual Connectivity; 3GPP TSG RAN WG2 #83bis; R2-133295; Oct. 7-11, 2013; Ljubljana, Slovenia.
CATT; Signalling Flow for Main Scenarios; 3GPP TSG RAN WG2 Meeting #83bis; R2-133372; Oct. 7-11, 2013; Ljubljana, Slovenia.
Intel Corporation; Detailed signaling procedure for dual connectivity; 3GPP TSG-RAN2 Meeting #83bis; R2-133491; Oct. 7-11, 2013; Ljubljana, Slovenia.
Samsung; SFN handling for Small cells; 3GPP TSG RAN WG2 #84; R2-134015; Nov. 11-15, 2013; San Francisco, CA.
Chinese Office Action dated Dec. 12, 2017, issued in the Chinese Application No. 201480003817.2.

* cited by examiner

METHOD FOR ACQUIRING SYSTEM FRAME NUMBER BY TERMINAL, TERMINAL, AND MOBILE COMMUNICATION SYSTEM

TECHNICAL FIELD

The present invention relates to a method and apparatus for operating a small cell effectively in a LTE-based small cell environment and, in particular, to a method, terminal, and mobile communication system for acquiring System Frame Number (SFN).

BACKGROUND ART

Mobile communication systems were developed to provide the subscribers with voice communication services on the move. With the rapid advance of technologies, the mobile communication systems have evolved to support high speed data communication services beyond the early voice-oriented services. However, the limited resource and user requirements for higher speed services in the current mobile communication system spur the evolution to more advanced mobile communication systems.

As one of the next-generation mobile communication systems to meet such requirements, standardization for a Long Term Evolution Advanced (LTE-A) system is underway in the $3^{rd}$ Generation Partnership Project (3GPP). LTE-A is one of the high speed packet-based communication technologies supporting data rate higher than that of the current mobile communication technology under the objective to complete the standardization in late 2010.

With the evolvement of the 3GPP standard, many discussions are being conducted for optimizing the radio network in addition to the effort for increasing data rate. In mobile communication systems, small cells characterized by small service areas are frequently used to increase system throughput and remove coverage holes. However, the small cell deployment causes considerable problems in view of supporting mobility such as handover failure. Nevertheless, researches about system parameter application or operation mechanism suitable for small size service areas are very scarce.

DISCLOSURE OF INVENTION

Technical Problem

The present invention aims to provide a System Frame Number (SFN) acquisition method of a terminal capable of using different SFNs between Secondary Cell Group (SCG) and Master Cell Group (MCG), method, and mobile communication system.

Solution to Problem

In accordance with an aspect of the present invention, a System Frame Number (SFN) acquisition method of a terminal is provided. The SFN acquisition method includes receiving a first message for adding a secondary cell of a secondary base station from a primary cell of a primary base station, receiving a Master Information Block (MIB) broadcast in the secondary cell, and acquiring a SFN information for the secondary cell from the MIB, and applying the SFN information to at least one cell of the secondary base station.

In accordance with another aspect of the present invention, a method for a base station to provide a System Frame Number (SFN) is provided. The method includes determining to add a secondary cell of the base station in cooperation with the other base station connected to the terminal through a primary cell and transmitting a Maser Information Block (MIB) including SFN information to be applied to at least one of the base station through the secondary cell.

In accordance with another aspect of the present invention, a method for a base station to provide a System Frame Number (SFN) is provided. The method includes connecting a primary cell of the base station to a terminal, determining to add a secondary cell of another base station to the terminal, and transmitting a first message including system information of the secondary cell except for SFN to be applied to at least one cell of the other base station, wherein the SFN to be applied to at least one cell of the other base station is broadcast in the secondary cell.

In accordance with another aspect of the present invention, a terminal is provided. The terminal includes a transceiver which transmits and receives signals to and from a primary and secondary base stations and a control unit which controls the transceiver to receive a first message for adding a secondary cell of the secondary base station from a primary cell of the primary base station and to receive a Master Information Block (MIB) broadcast in the secondary cell, acquires a SFN information for the secondary cell from the MIB, and applies the SFN information to at least one cell of the secondary base station.

In accordance with another aspect of the present invention, a base station is provided. The base station includes a transceiver which transmits and receives signals to and from a terminal and another base station and a control unit which determines to add a secondary cell of the base station in cooperation with the other base station connected to the terminal through a primary cell and control the transceiver to transmit a Maser Information Block (MIB) including SFN information to be applied to at least one of the base station through the secondary cell.

In accordance with still another aspect of the present invention, a base station is provided. The base station includes a transceiver which transmits and receives signals to and from a terminal and another base station and a control unit which connects a primary cell of the base station to a terminal, determines to add a secondary cell of another base station to the terminal, and controls the transceiver to transmit a first message including system information of the secondary cell except for SFN to be applied to at least one cell of the other base station, wherein the SFN to be applied to at least one cell of the other base station is broadcast in the secondary cell.

Advantageous Effects of Invention

The SFN acquisition method, terminal, and mobile communication system of the present invention are advantageous in terms of applying different SFNs to the Secondary Cell Group (SCG) and Master Cell Group (MCG) by allowing a cell belonging to the SCG to provide SFN. Also, the SFN acquisition method, terminal, and mobile communication system of the present invention are advantageous in terms of applying different SFNs to the SCG and MCG by allowing a cell belonging to the SCG to provide the SFN in such a way of allocating the SFN and SFN offset value to the terminal.

MODE FOR THE INVENTION

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Although the embodiments of the present invention are directed to Advanced E-UTRA (or LTE-A) supporting carrier aggregation, it will be understood to those skilled in the art that the subject matter of the present invention can be applied to other communication systems having the similar technical background and channel format, with slight modification, without departing from the spirit and scope of the present invention. For example, the subject matter of the present invention can be applied to the multicarrier HSPA supporting carrier aggregation.

The specification and drawings are to be regarded in an illustrative rather than a restrictive sense in order to help understand the present invention. It is obvious to those skilled in the art that various modifications and changes can be made thereto without departing from the broader spirit and scope of the invention.

The present invention relates to a method and apparatus for operating small cells effectively in the LTE-based small cell environment. The present invention proposes a method of providing a terminal (User Equipment; UE) with a System Frame Number (SFN) information of the small cell in the case where the macro and small cells use different SFNs. Also, the present invention proposes a method of applying RRC diversity to the UE operating in a dual connectivity mode for connecting to the macro and small cells simultaneously. Prior to the explanation of the present invention, a description is made of deployment of cells having small service areas. In the following description, the cell having a relatively small service area is referred to as small cell. In the following embodiment, the cell of which the radius is in the range from 5 to 200 m is referred to as small cell.

In the following description, the term 'SFN information' is used in the meaning of including at least one of an SFN and information indicating the SFN. Also, the term 'SFN offset value' is used in the meaning of including at least one of an SFN offset indicator and an SFN offset.

Figure 1:
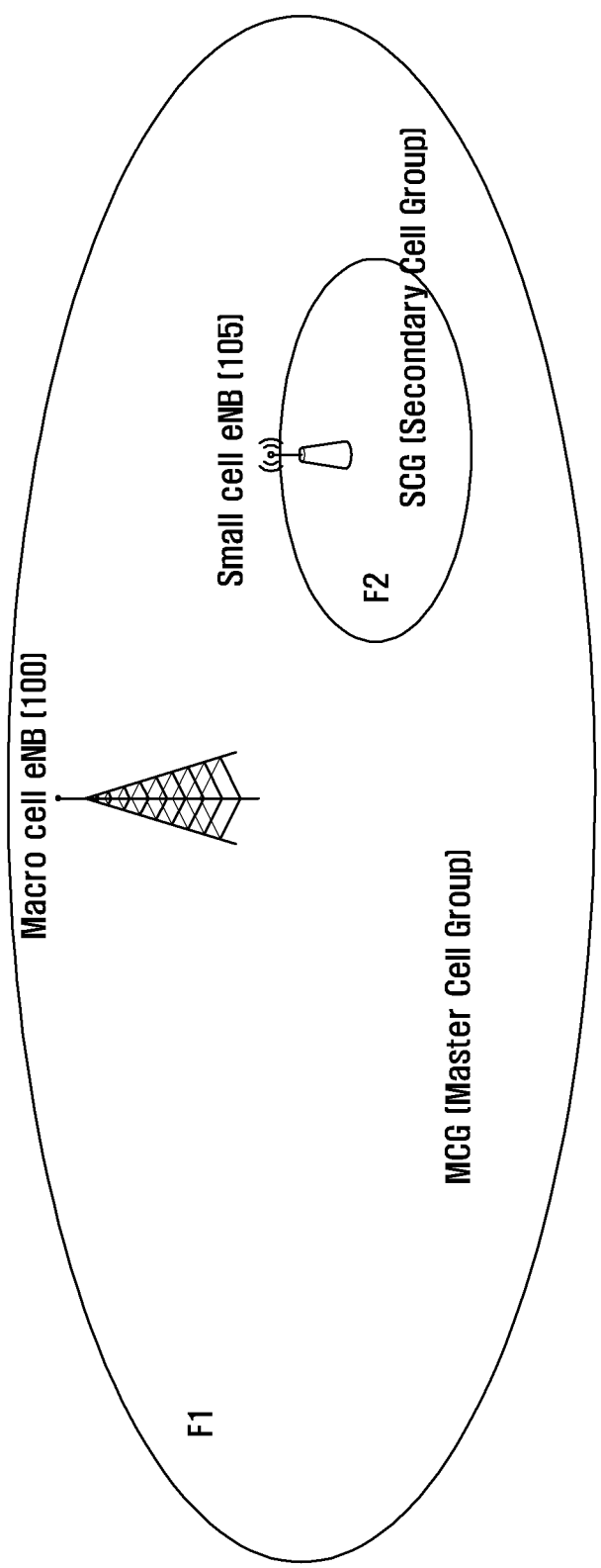
FIG. 1 is a diagram for explaining a small cell deployment scheme.

FIG. 1 is a diagram for explaining a small cell deployment scheme.

Referring to FIG. 1, the first deployment scheme is to deploy small cell evolved Node Bs (eNBs) 105 sparsely in the service area of the macro cell eNB 100. Here, the sparse deployment may have a meaning of deploying the small cells sparsely so as not to be overlapped with each other. Such deployment is useful to cover hot spot areas where traffics are concentrated or remove coverage holes. Depending on whether the small cell uses a frequency identical with or different from that of the macro cell, the movement of a UE from the macro cell to the small cell or vice versa causes intra-frequency or inter-frequency handover (HO). As another deployment scheme, it can be considered to deploy a plurality of small cells densely. The dense deployment may have a meaning of deploying the small cells densely so as to be overlapped with each other. The UE may connect to the macro and small cells simultaneously to receive data. This is referred to as Dual Connectivity. Particularly, a set of the serving cells under the control of a small cell eNB (small eNB) is referred to as a Secondary Cell Group (SCG), and a set of the serving cells under the control of a macro cell eNB (macro eNB) is referred to as a Master Cell Group (MCG).

Embodiment 1

This embodiment proposes two methods of providing the SFN information to the SCG when different SFNs are applied to the MCG and SCG. In the legacy LTE Rel-10 Carrier Aggregation (CA), the same SFN(System Frame Number) is applied to the Primary Cell (PCell) and Secondary Cell (SCell). The CA technique is characterized in that a service is provided through a plurality of serving cells unlike the conventional technique in which a service is provided through one serving cell. Here, the cell playing the same role as the legacy serving cell is the PCell. The eNB can receive feedback information from the UE through a Physical Uplink Control Channel (PUCCH) and perform the operations related to handover and Radio Link Monitoring/Radio Link Failure (RLM/RLF) in the PCell. Also, the UE acquires essential information from the System Information (SI) broadcast by the eNB. Examples of the information may include SFN, frequency bandwidth, cell ID, access barring information, and idle mode cell measurement configuration information. Meanwhile, the serving cell(s) configured in addition to the PCell is (are) the SCell(s). The system informations of the SCells are provided through dedicated signaling, and the SCells do not participate in the operations related to handover and RLM/RLF. In the system information, the SFN is set to a value in the range from 0 to 1023 in order to number the radio frames. That is, as time goes, the SFN increases by 1 every radio frame. In Rel-10 CA, the same SFN is applied to both the PCell and SCell. The PCell broadcasts the SFN information through MIB as part of the system information, and the UE applies the SFN information to both the PCell and SCell. Accordingly, the system information of the SCell which is provided through dedicated signaling has no SFN information. The SFN is used for various functionalities such as System Information Block (SIB) scheduling, Discontinuous Reception (DRX) configuration, measurement gap, enhanced Inter-Cell Interference Coordination (eICIC), In Device Coexistence (IDC), and Relay Node (RN).

In the small cell environment, the macro and small cells eNBs coexist separately. Accordingly, it may be difficult to implement the procedure of applying the same SFN to the macro and small cells due to the synchronization difficulty. In the case that the deployed eNBs are manufactured by different manufacturers, it may be more difficult to implement the procedure of applying the same SFN to the macro and small cells. However, it is preferred to apply the same SFN to the serving cells at least belonging to the MCG or the same SCG. The present invention proposes two methods of providing the SCG with SFN information which is different from that of MCG when different SFNs are applied to the MCG and SCG.

The first method is characterized by designating a serving cell which broadcasts the SFN information in the SCG such that the UE acquires the SFN information applied to the SCG. In the present invention, the serving cell providing the SFN information is referred to as primary Secondary Cell (pSCell). The pSCell is characterized in that it has PUCCH and is capable of receiving the feedback information of the serving cells of the SCG.

Figure 2:
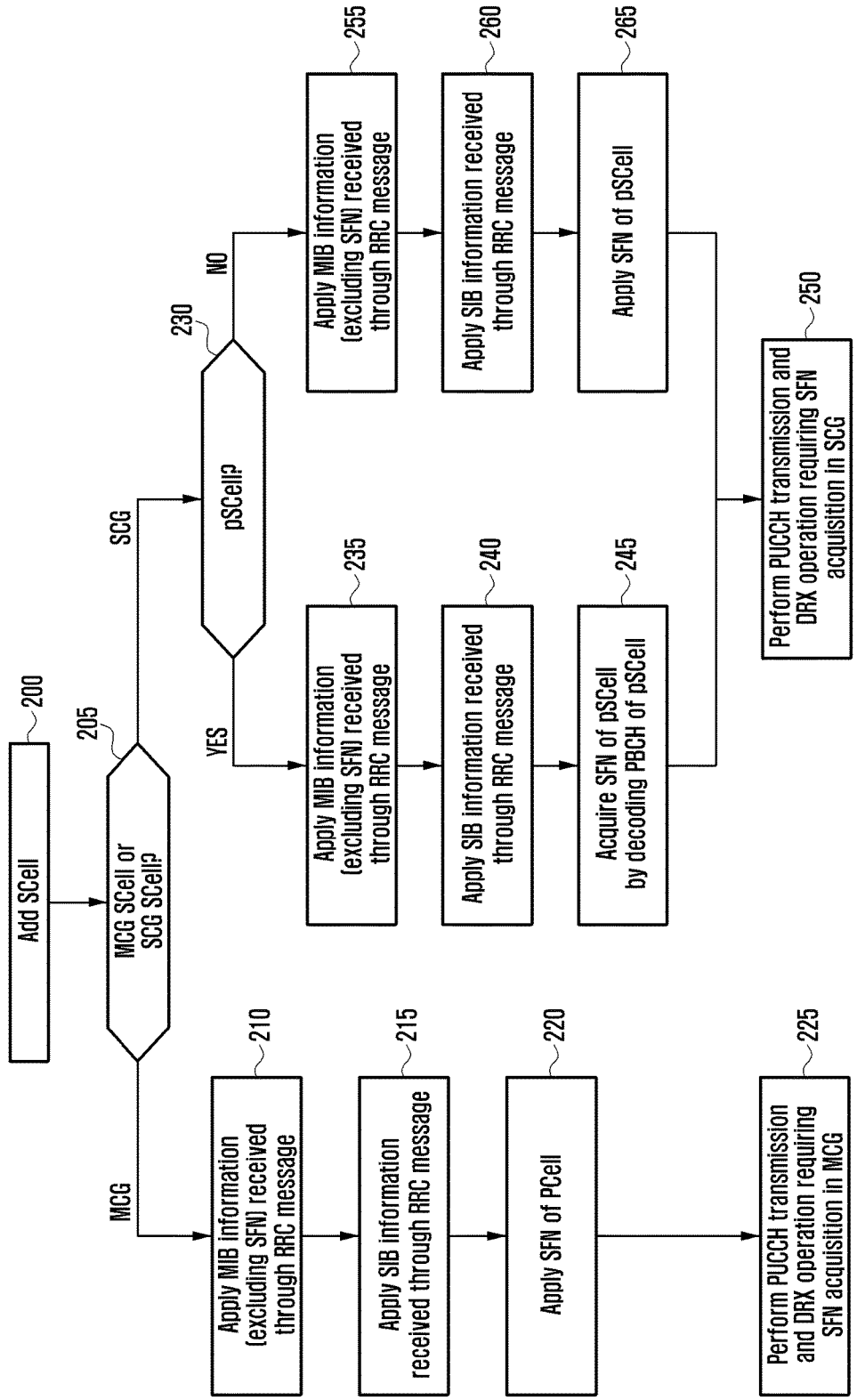
FIG. 2 is a flowchart illustrating a UE operation in the case where SFN information to be applied to an SCG is transmitted through a specific serving cell belonging to the SCG.

FIG. 2 is a flowchart illustrating a UE operation in the case where SFN information to be applied to an SCG is transmitted through a specific serving cell belonging to the SCG.

Referring to FIG. 2, the UE adds an SCell at step 200. The UE determines whether the SCell belongs to the MCG or the SCG at step 205. If the SCell belongs to the MCG, the UE applies the MIB of the SCell which has been received through a Radio Resource Control (RRC) message at step 210. The UE applies the SIB of the SCell which has been received through the RRC message at step 215. The UE applies the SFN information included in the MIB broadcast through the PCell at step 220. The UE applies the SFN information to perform PUCCH transmission and/or DRX operation at step 225. If the SCell belongs to the SCG at step 205, the UE determines whether the SCell is the pSCell at step 230. If so, the UE applies the MIB information including no SFN which has been received through the RRC message at step 235. Here, the UE may receive the RRC message through the PCell or SCell of the MCG. The RRC message includes the system information to be applied to the SCell as well as the SCell configuration information. The UE applies the SIB of the SCell which has been received through the RRC message at step 240. The UE decodes the PBCH (channel carrying the MIB) broadcast through the pSCell to acquire the SFN at step 245. The UE applies the SFN information to perform PUCCH transmission and/or DRX operation at step 250. If the SCell is not the pSCell at step 230, the UE applies the MIB of the SCell which has been received through the RRC message at step 255. Here, the UE may receive the RRC message through the pSCell of the SCG. The UE applies the SIB of the SCell which has been received through the RRC message at step 260. The UE applies the SFN information of the pSCell at step 265. At step 265, the UE performs PUCCH transmission and/or DRX operation by applying the SFN information.

The second method is characterized by allowing the eNB to provide the UE with an offset value indicating the difference between the SFNs applied to the MCG and SCG in order for the UE to calculate SFN for the SCG through dedicated signaling. In this way, the UE can calculate the SFN to be applied to the SCG.

Figure 3:
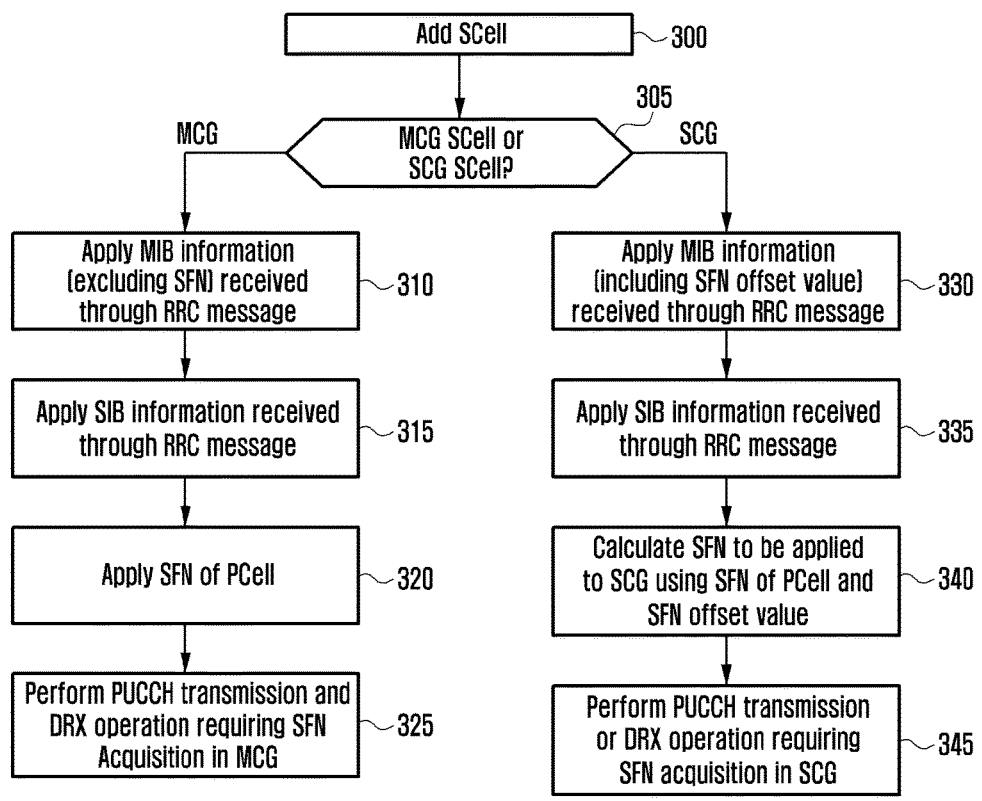
FIG. 3 is a flowchart illustrating a UE operation in the case where an offset value for use in calculating an SFN to be applied to an SCG.

FIG. 3 is a flowchart illustrating a UE operation in the case where an offset value for use in calculating an SFN to be applied to an SCG.

Referring to FIG. 3, the UE adds an SCell at step 300. The UE determines whether the SCell belongs to the MCG or an SCG at step 305. If the SCell belongs to the MCG, the UE applies the MIB of the SCell which has been received through an RRC message at step 310. The UE applies the SIB of the SCell which has been received through the RRC message at step 315. The UE applies the SFN information included in the MIB broadcast through the PCell at step 320. The UE performs PUCCH transmission and/or DRX operation by applying the SFN information at step 325. If the SCell belongs to an SCG at step 305, the UE applies the MIB information received through the RRC message at step 330. The RRC message includes an SFN offset value indicating the difference between the SFNs to be applied to the MCG and SCG. The RRC message includes the system information to be applied to the SCell as well as the SCell configuration information. The UE applies the SIB of the SCell which has been received through the RRC message at step 335. The UE calculates the SFN value to be applied to the SCG using the SFN information broadcast through the PCell of the MCG and the SFN offset received through the RRC message at step 340. The SFN value applied to the current SCG is defined as 'SFN value to be applied to MCG+SFN offset'. The unit of SFN offset value may be 10 ms which is equal to the length of a radio frame. The UE performs PUCCH transmission and/or DRX operation by applying the SFN information acquired through the above calculation at step 345.

Embodiment 2

This embodiment is directed to an RRC diversity technique. The RRC diversity is a technique of improving the successful reception probability of an RRC message by transmitting/receiving the same RRC message repeatedly from/to the multiple eNBs to/from the UE. The RRC diversity can be applied in downlink (DL) and uplink (UL). In the DL RRC diversity, the UE receives the same RRC message from a plurality of eNBs. In the UL RRC diversity, the UE transmits the same RRC message to a plurality of eNBs. This may increase successful transmission probability of the RRC message at the cell edge.

Figure 4:
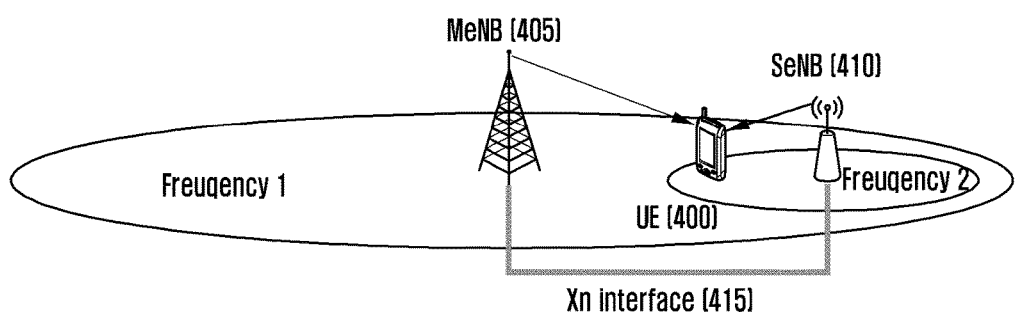
FIG. 4 is a diagram illustrating the concept of the RRC diversity technique.

FIG. 4 is a diagram illustrating the concept of the RRC diversity technique.

Referring to FIG. 4, the UE 400 receives the same RRC message from the two eNBs, i.e. the Master eNB (MeNB) 405 and the Secondary eNB (SeNB) 410, simultaneously. The RRC message addressed to the UE is exchanged through the Xn backhaul between the MeNB and SeNB. The two eNBs may operate on the same frequency or different frequencies. The UE may not receive the RRC message because the signal strength of the MeNB is not strong enough. If the SeNB transmits the same RRC message to the UE too, the successful reception probability may improve. Typically, it is expected that the RRC diversity is triggered only when a certain level of diversity gain is predicted but not always. It is preferred to apply the RRC diversity only when a predetermined level of diversity gain is predicted instead of applying the RRC diversity by taking notice of UE transmission power constraint, low uplink load in comparison to downlink load, and UE complexity for processing multiple RRC message. The present invention proposes an enhanced method of applying the RRC diversity.

Figure 5:
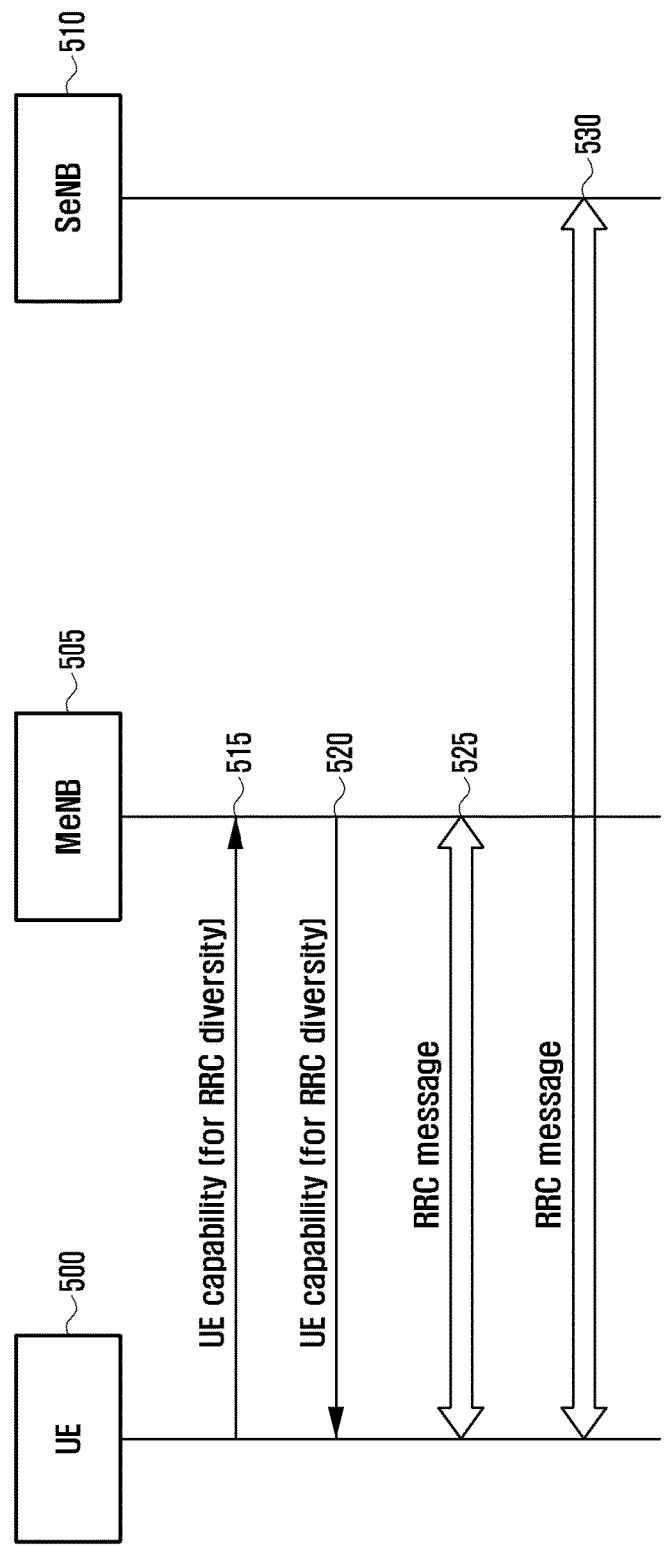
FIG. 5 is a signal flow diagram illustrating a basic procedure of applying the RRC diversity.

FIG. 5 is a signal flow diagram illustrating a basic procedure of applying the RRC diversity.

Referring to FIG. 5, the UE sends the MeNB 505 the UE capability indicating whether the UE 500 supports RRC diversity at step 515. The MeNB 505 configures or triggers the RRC diversity by transmitting a predetermined RRC message, e.g. RRC Connection Reconfiguration, at step 520. At steps 525 and 530, the UE 500, the MeNB 505, and the SeNB 510 exchange the same RRC message. The simplest method of applying the RRC diversity is to apply the RRC diversity always after configuration. However, if a specific link is very good, it may be possible to transmit the RRC message through the corresponding link with the high successful transmission probability. In this case, the RRC diversity may cause more radio resource waste and more unnecessary UE and/or eNB operations than diversity gain. Accordingly, it is more effective to apply the RRC diversity only when the RRC diversity gain is expected. The present invention proposes a method of applying the RRC diversity selectively in uplink. Particularly, the present invention proposes two methods that are selectively applied depending on whether the RRC diversity is activated by the UE or the eNB. Although the description has been directed to the uplink, the present invention is applicable to the downlink in a similar way.

Figure 6:
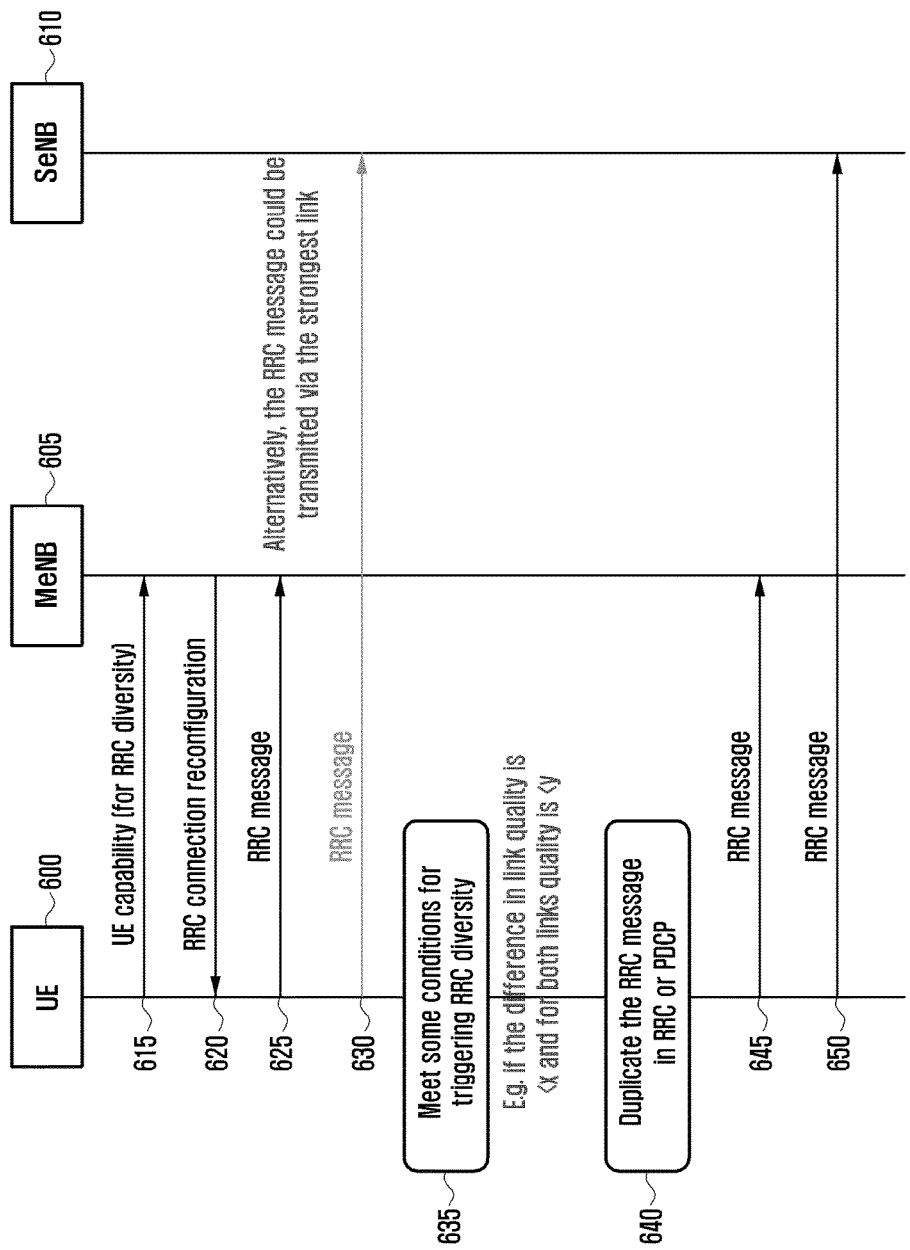
FIG. 6 is a signal flow diagram illustrating a procedure for the UE to activate the RRC diversity according to a predetermined condition.

FIG. 6 is a signal flow diagram illustrating a procedure for the UE to activate the RRC diversity according to a predetermined condition.

Referring to FIG. 6, the UE 600 sends the MeNB 605 a UE capability message indicating whether the UE 600 supports the RRC diversity at step 615. The MeNB 605 configures the RRC diversity to the UE 600 using a predetermined RRC message at step 620. Although the RRC diversity has been configured, it is not activated immediately until a predetermined condition is fulfilled. At steps 625 and 630, the UE sends an RRC message to the MeNB 605 and the SeNB 610. Alternatively, the UE may transmit the RRC message via the best one of the two links to the MeNB and SeNB. For example, if the received signal quality of one of macro and small cell links is greater than a predetermined threshold X, the UE transmits the RRC message to the link on which the signal quality is better than the other. If it is determined that the predetermined conditions for obtaining the diversity gain is fulfilled at step 635, the UE activates the RRC diversity and duplicates the RRC message on the RRC or PDCP layer at step 640 and transmits the messages to both the eNBs at steps 645 and 650. In the state that the RRC diversity is activated, the various conditions for determining whether the diversity gain is expected. For example, there are conditions 1 and 2 as follows.

Condition 1: If the difference of the received signal qualities of two links (macro and small cells) is equal to or greater than a predetermined threshold Y and the received signal qualities of both the two links are lower than a predetermined threshold Z, the RRC diversity is activated.

Condition 2: If the received signal qualities of both of the two links are lower than the threshold Z, the RRC diversity is activated.

Here, the received signal quality may be one of Reference Signal Received Power (RSRP), Reference Signal Received Quality (RSRQ), Block Error Rate (BLER), and Channel Status Indication (CSI). The aforementioned thresholds Y and Z may be the values which are predetermined fixedly or the values which the eNB configures and transmits to the UE. If the above conditions are not fulfilled, the UE stops the ongoing RRC diversity.

Figure 7:
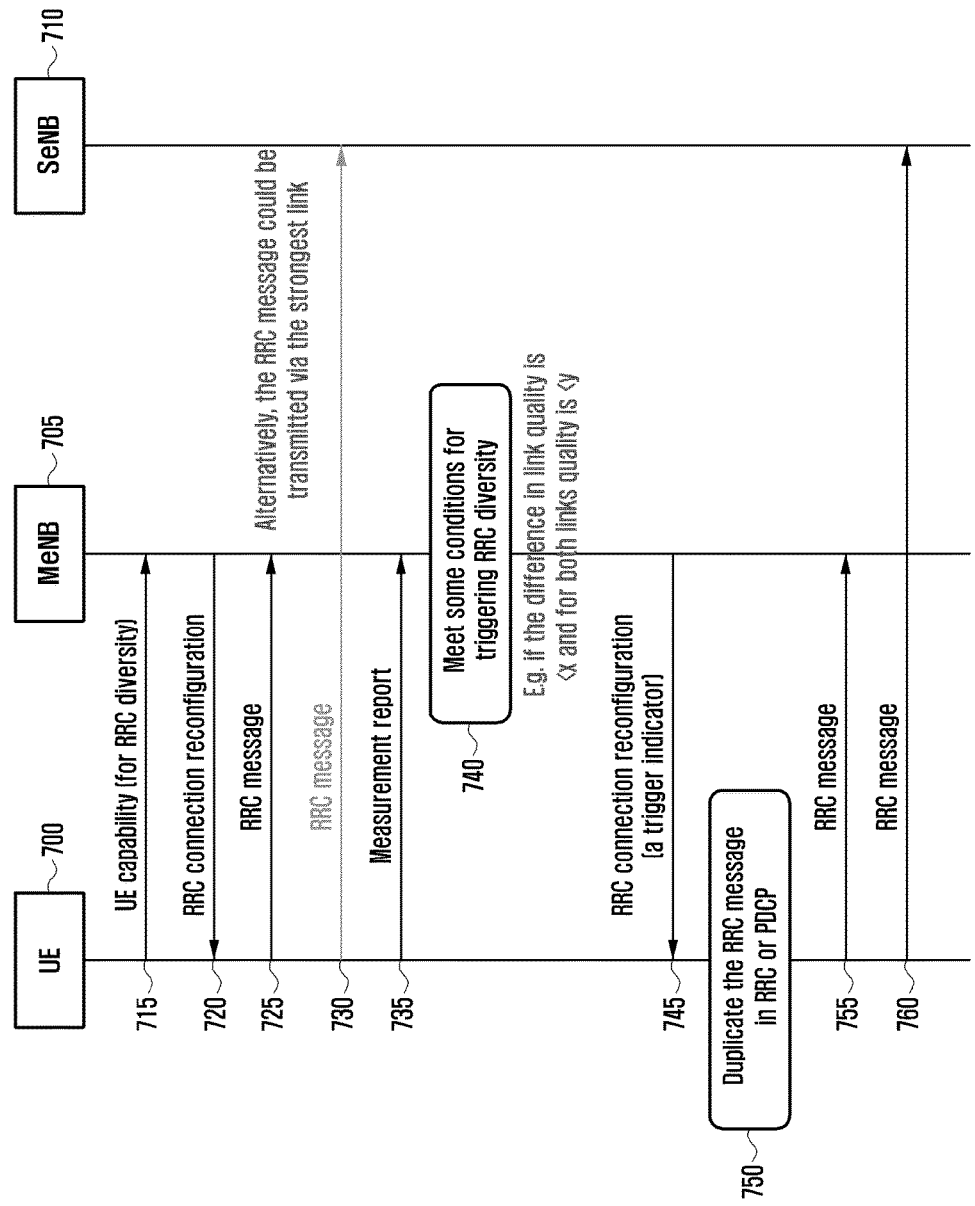
FIG. 7 is a signal flow diagram illustrating a procedure for the eNB to activate the RRC diversity according to predetermined conditions.

FIG. 7 is a signal flow diagram illustrating a procedure for the eNB to activate the RRC diversity according to predetermined conditions.

Referring to FIG. 7, the UE 700 sends the MeNB 750 a UE capability message indicating whether the UE 700 supports the RRC diversity at step 715. The MeNB 705 configures the RRC diversity to the UE 700 using a predetermined RRC message at step 720. The RRC diversity configuration information may include RRC diversity activation conditions and related threshold values. Although the RRC diversity has been configured, it is not activated immediately until a predetermined condition is fulfilled. At steps 725 and 730, the UE sends an RRC message to the MeNB 705 and the SeNB 710. Alternatively, the UE may transmit the RRC message via the best one of the two links to the MeNB and SeNB. For example, if the received signal quality of one of macro and small cell links is greater than a predetermined threshold X, the UE transmits the RRC message to the link on which the signal quality is better than the other. The UE sends the MeNB 705 (or SeNB 710) the cell measurement information at step 735. The eNB determines whether the conditions for obtaining the diversity gain with the activation of the RRC diversity is fulfilled based on the measurement information received from the UE at step 740. If it is determined to activate the RRC diversity, the MeNB 705 sends the UE 700 a predetermined RRC message including an indicator indicating activation of the RRC diversity at step 745. This indicator is set to 0 for indicating activation of the RRC diversity or 1 for indicating deactivation of the RRC diversity. The UE deactivates the RRC diversity and duplicates the RRC message on the RRC or PDCP layer at step 750 and transmits the duplicated message to both of the two eNBs at steps 755 and 760. In the state that the RRC diversity is activated, the various conditions for determining whether the diversity gain is expected. The conditions have been described above. If a predetermined condition is fulfilled, the UE reports the cell measurement information to the eNB periodically, and the eNB determines whether to control the UE to stay in the RRC diversity mode based on the measurement information. If it is determined that the RRC diversity gives no gain any more, the eNB sends the UE the RRC message including the indicator indicating deactivation of the RRC diversity.

Embodiment 3

If a predetermined cause occurs, the Universal Mobile Telecommunication System (UMTS) and LTE systems reject the connection request of the UE and perform redirection to facilitate connection to the counterpart system. If the connection request is rejected, the UE attempts connection to the counterpart system based on the redirection information. Depending on the case, however, the UE may fail to establish a connection to any system and just repeat redirection. The present invention proposes a method to resolve this non-preferred situation.

Figure 8:
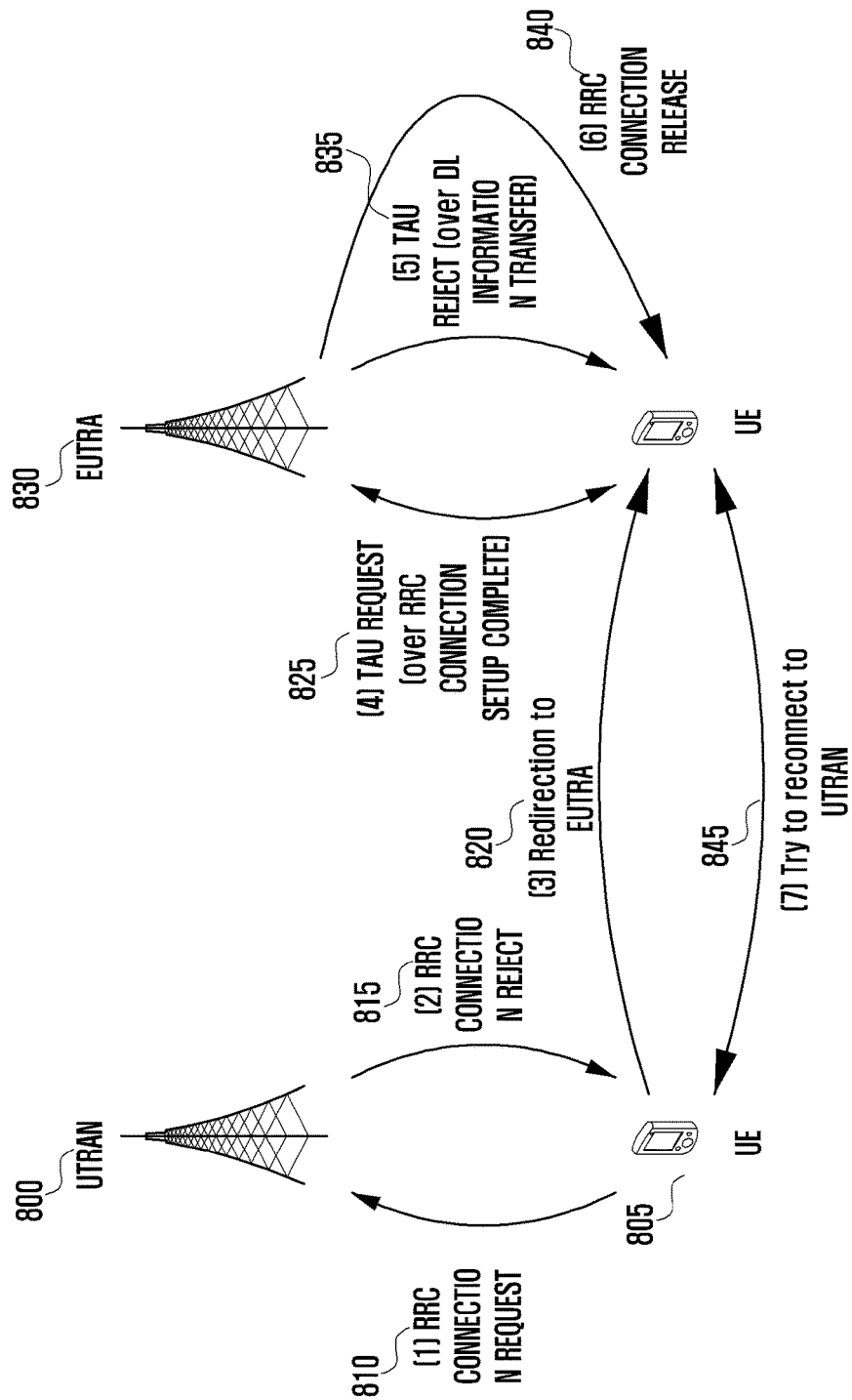
FIG. 8 is a diagram for explaining a situation in which a UE fails to establish a connection to any system but just continues performing redirection.

Prior to the explanation of the present invention, the problems to be solved are described. FIG. 8 is a diagram for explaining a situation in which a UE fails to establish a connection to any system but just continues performing redirection.

Referring to FIG. 8, a UE 805 attempts connection establishment with a UMTS base station 800. For this purpose, the UE 805 sends the base station 800 an RRC CONNECTION REQUEST message at step 810. If the base station 800 rejects the connection request for a predetermined reason such as network congestion, it sends the UE 805 an RRC CONNECTION REJECT message at step 815. This RRC message may include redirection information optionally. This information indicates another frequency or system to which the UE has to attempt connection establishment. The UE of which the connection request has been rejected attempts connection to another frequency or system at step 820. For example, the UE may be redirected to the LTE system. The UE attempts connection to the LTE base station 830 and sends the MME of the LTE system an RRC CONNECTION SETUP COMPLETE message carrying a Tracking Area Update (TAU) REQUEST message at step 825. The UE 805 notifies that it has move to the LTE network using the TAU REQUEST message. However, the LTE system may not support the UE 805 for a certain reason. For example, the LTE system may have no contract for providing services for the roaming UE 805. If the LTE system does not support the UE 805 for such a reason, the MME sends the UE 805 a TAU REJECT message over the DL INFORMATION TRANSMFER message at step 835. Also, the LTE base station 830 sends the UE 805 an RRC CONNECTION RELEASE message to terminate the RRC connected mode at step 840. At this time, the UMTS system is likely to keep still providing the UE with the very good channel. Accordingly, the UE 805 attempts connection to the UMTS base station 800 again at step 845. However, the connection request is rejected and thus the UE 805 repeats the above-described operations so as to stay in the state unconnected to any system. In order to escape from this situation, it is required to restrict attempting connection to the LTE system which does not provide the service to the UE 805. The present invention proposes a method to solve the above problem without extra UE operations such as frequency measurement and SI reception and decoding.

Figure 9:
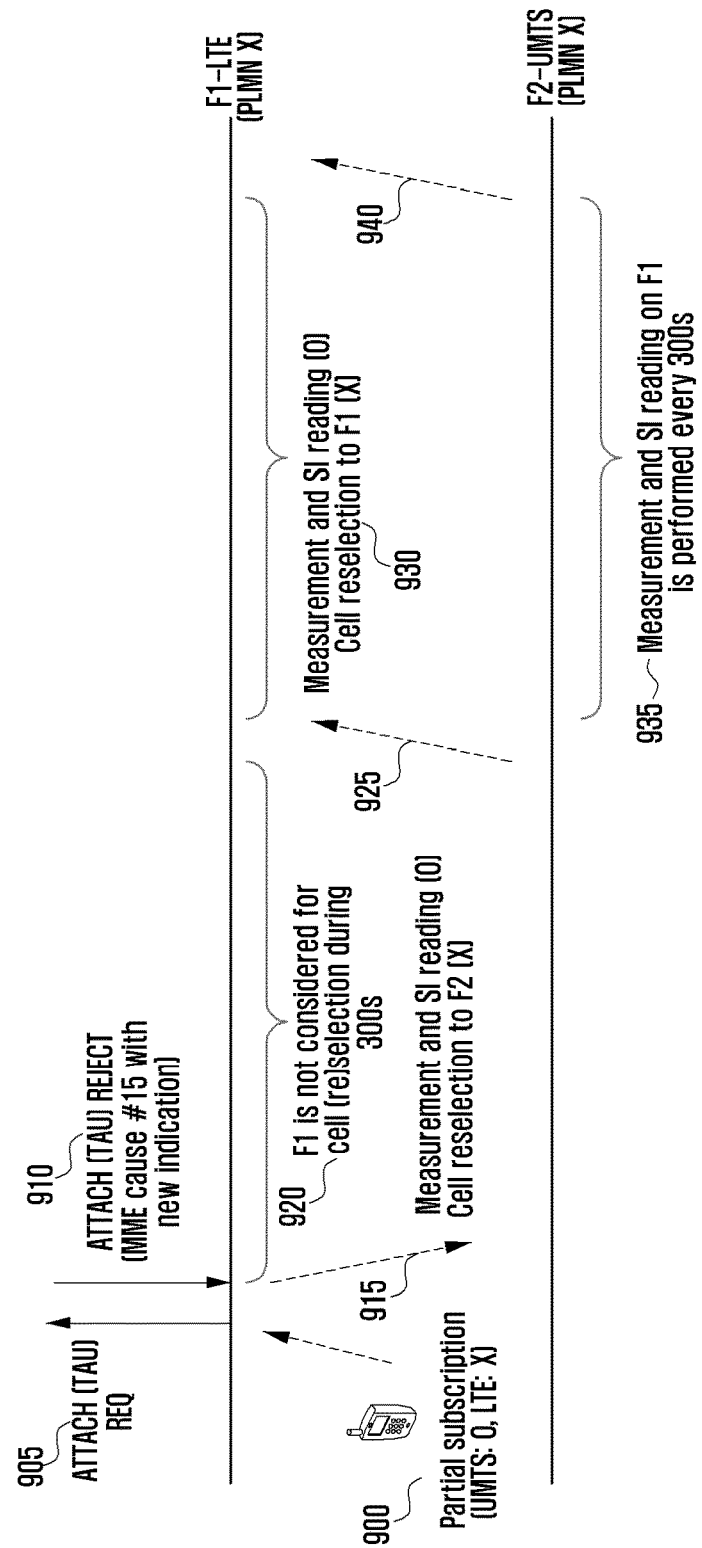
FIG. 9 is a diagram for explaining a method of solving the problem of repetitive occurrence of UMTS-LTE redirection.

FIG. 9 is a diagram for explaining a method of solving the problem of repetitive occurrence of UMTS-LTE redirection.

Referring to FIG. 9, a UE 900 which has a contract for a service in a UMTS network but not in an LTE network moves to the LTE network according to the redirection information and sends an MME an ATTACH (or TAU) request message at step 905. The MME checks that there is no contract for serving the UE 900 and then sends the UE 900 an ATTACH REJECT message. The ATTACH REJECT message includes an MME cause indicating the rejection reason. In the above case, a MME cause #15 is included along with a new indicator. The MME cause #15 denotes that the roaming UE is not allowed in the corresponding Tracking Area (TA), and the UE which has received this message excludes the frequency indicated by the new indicator in the cell reselection process for 300 seconds. In this case, the new indicator includes the frequency information (F1) of the LTE network to which the UE 900 is attempting connection. In the method according to the present invention, the UE which has received the MME cause #15 and the new indicator is not served in all TAs but only in a specific TA. Accordingly, it is regarded that the access attempts to all TAs on the indicated frequency are blocked. For reference, table 1 shows IE EMM causes that are indicated with total 2 bytes respectively.

TABLE 1

| Cause value (octet 2) | | | | | | | | |
|---|---|---|---|---|---|---|---|---|
| Bits | | | | | | | | |
| 8 | 7 | 6 | 5 | 4 | 3 | 2 | 1 | |
| 0 | 0 | 0 | 0 | 0 | 0 | 1 | 0 | IMSI unknown in HSS |
| 0 | 0 | 0 | 0 | 0 | 0 | 1 | 1 | Illegal UE |
| 0 | 0 | 0 | 0 | 0 | 1 | 0 | 1 | IMEI not accepted |
| 0 | 0 | 0 | 0 | 0 | 1 | 1 | 0 | Illegal ME |
| 0 | 0 | 0 | 0 | 0 | 1 | 1 | 1 | EPS services not allowed |
| 0 | 0 | 0 | 0 | 1 | 0 | 0 | 0 | EPS services and non-EPS services not allowed |
| 0 | 0 | 0 | 0 | 1 | 0 | 0 | 1 | UE identity cannot be derived by the network |
| 0 | 0 | 0 | 0 | 1 | 0 | 1 | 0 | Implicitly detached |
| 0 | 0 | 0 | 0 | 1 | 0 | 1 | 1 | PLMN not allowed |
| 0 | 0 | 0 | 0 | 1 | 1 | 0 | 0 | Tracking Area not allowed |
| 0 | 0 | 0 | 0 | 1 | 1 | 0 | 1 | Roaming not allowed in this tracking area |
| 0 | 0 | 0 | 0 | 1 | 1 | 1 | 0 | EPS services not allowed in this PLMN |
| 0 | 0 | 0 | 0 | 1 | 1 | 1 | 1 | No Suitable Cells In tracking area |
| 0 | 0 | 0 | 1 | 0 | 0 | 0 | 0 | MSC temporarily not reachable |
| 0 | 0 | 0 | 1 | 0 | 0 | 0 | 1 | Network failure |
| 0 | 0 | 0 | 1 | 0 | 0 | 1 | 0 | CS domain not available |
| 0 | 0 | 0 | 1 | 0 | 0 | 1 | 1 | ESM failure |
| 0 | 0 | 0 | 1 | 0 | 1 | 0 | 0 | MAC failure |
| 0 | 0 | 0 | 1 | 0 | 1 | 0 | 1 | Synch failure |
| 0 | 0 | 0 | 1 | 0 | 1 | 1 | 0 | Congestion |
| 0 | 0 | 0 | 1 | 0 | 1 | 1 | 1 | UE security capabilities mismatch |
| 0 | 0 | 0 | 1 | 1 | 0 | 0 | 0 | Security mode rejected, unspecified |
| 0 | 0 | 0 | 1 | 1 | 0 | 0 | 1 | Not authorized for this CSG |
| 0 | 0 | 0 | 1 | 1 | 0 | 1 | 0 | Non-EPS authentication unacceptable |
| 0 | 0 | 1 | 0 | 0 | 0 | 1 | 1 | Requested service option not authorized |
| 0 | 0 | 1 | 0 | 0 | 1 | 1 | 1 | CS service temporarily not available |
| 0 | 0 | 1 | 0 | 1 | 0 | 0 | 0 | No EPS bearer context activated |
| 0 | 1 | 0 | 1 | 1 | 1 | 1 | 1 | Semantically incorrect message |
| 0 | 1 | 1 | 0 | 0 | 0 | 0 | 0 | Invalid mandatory information |
| 0 | 1 | 1 | 0 | 0 | 0 | 0 | 1 | Message type non-existent or not implemented |
| 0 | 1 | 1 | 0 | 0 | 0 | 1 | 0 | Message type not compatible with the protocol state |
| 0 | 1 | 1 | 0 | 0 | 0 | 1 | 1 | Information element non-existent or not implemented |
| 0 | 1 | 1 | 0 | 0 | 1 | 0 | 0 | Conditional IE error |
| 0 | 1 | 1 | 0 | 0 | 1 | 0 | 1 | Message not compatible with the protocol state |
| 0 | 1 | 1 | 0 | 1 | 1 | 1 | 1 | Protocol error, unspecified |

At this time, the UMTS system is likely to be still providing the UE with very good channel. Accordingly, the UE attempts connection to the UMTS base station again at step 915. However, the connection request must be rejected again. The UE may consider the frequency F1 as a cell reselection candidate after 300 seconds at step 925. For cell reselection, the UE performs cell measurement and decodes the System Information received from the LTE cell on the frequency F1. However, since the access to all of the TAs of the cell is barred, the UE cannot camp on any cell. As a consequence, the UE does not attempt ATTACH onto F1 but has to try cell measurement and SI acquisition at every 300 seconds. This causes a significant shortcoming of increasing the power consumption of the UE. In order to solve this problem, the present invention proposes two methods. In the first method, when the access of the UE to all TAs is barred, the UE rules out the corresponding frequency in the cell reselection process during the timer period longer than 300 or continuously. In the second method, if the access of the UE to all TAs belonging to a predetermined PLMN is barred, the UE rules out all LTE frequencies belonging to the PLMN in the cell reselection process. Since all of the LTE frequencies are excluded, the UE does not perform cell selection and SI acquisition continuously regardless of the predetermined time of 300 seconds.

Figure 10:
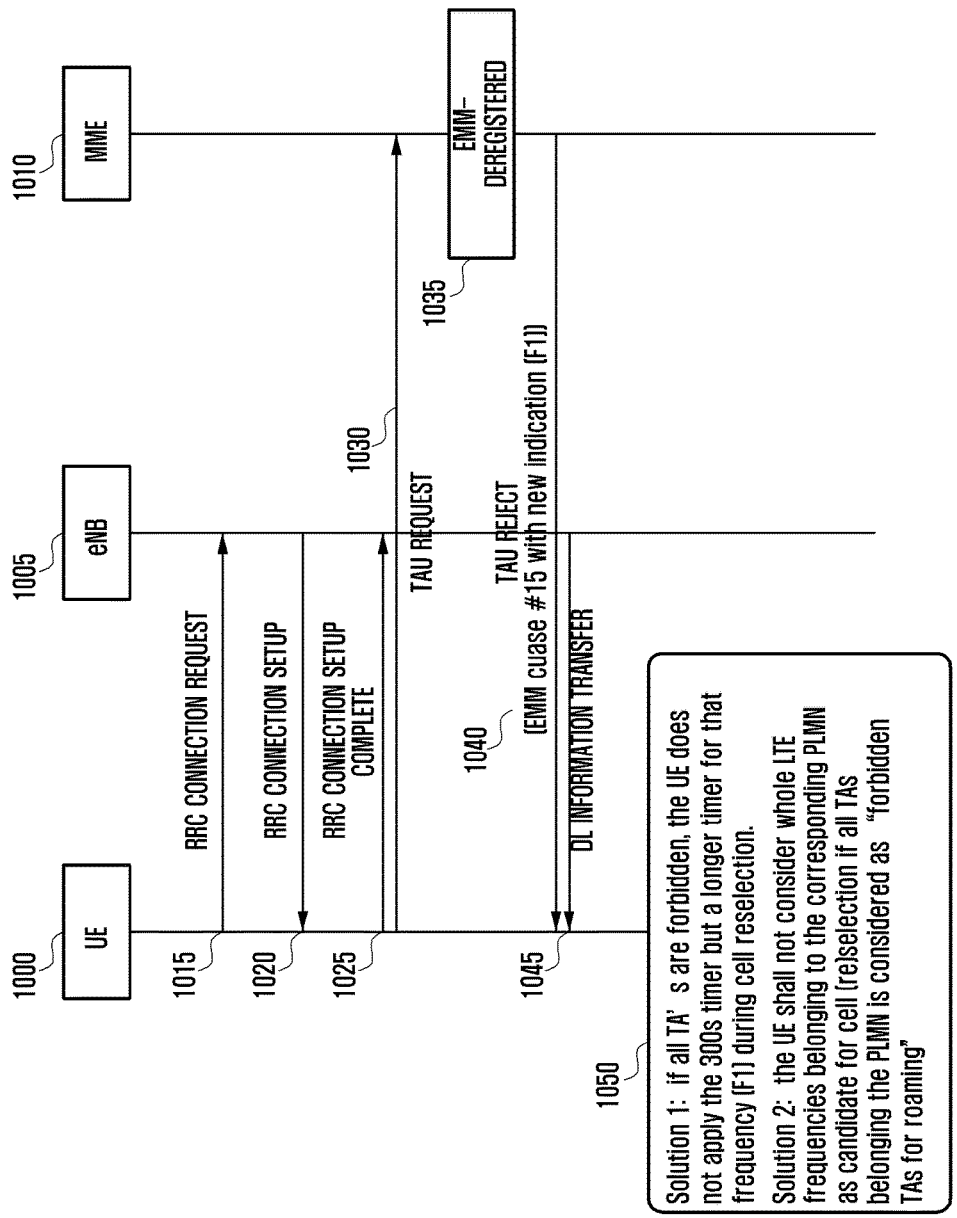
FIG. 10 is a signal flow diagram illustrating a method of solving the repetitive UMTS-LTE redirection problem.

FIG. 10 is a signal flow diagram illustrating a method of solving the repetitive UMTS-LTE redirection problem.

Referring to FIG. 10, the UE 1000 redirected from the UMTS network attempts access to the eNB 1005 by sending the RRC Connection Request message at step 1015. The eNB 1005 sends the UE 1000 an RRC Connection Setup message at step 1020. The UE 1000 sends the eNB 1005 an RRC Connection Setup Complete message containing the TAU Request message addressed to the MME 1010 at step 1025. In the EMM-DEREGISTERED state, the MME 1010 rejects the UE 1000 at step 1035. The MME 1010 sends the UE 1000 a TAU REJECT message including the EMM cause #15 indicating the rejection reason and a new indicator at step 1040. The TAU REJECT message is delivered to the UE 1000 through a DL information transfer on the Uu interface at step 1045. The UE stops performing the cell measurement and SI acquisition operations which are scheduled to be done at every 300 according to the UE operation proposed in the present invention at step 1050.

Figure 11:
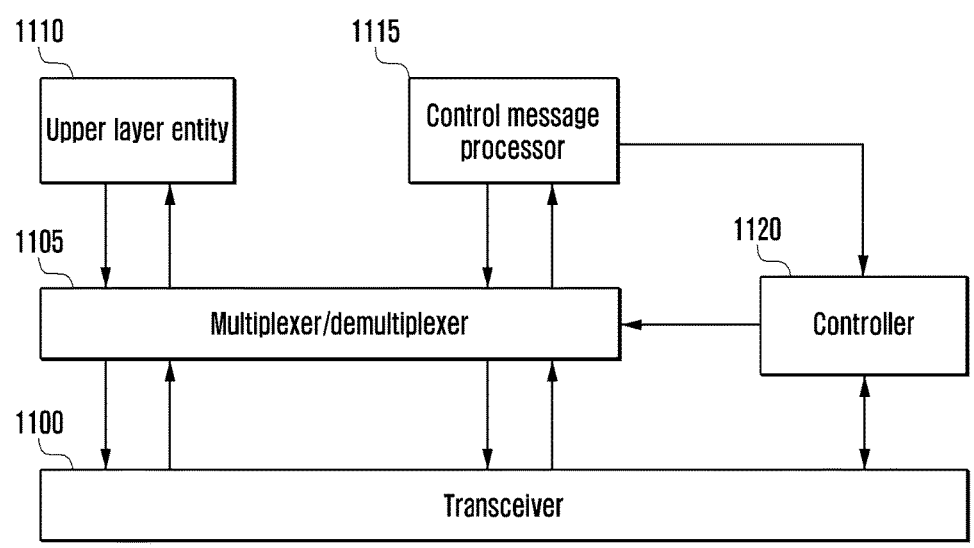
FIG. 11 is a block diagram illustrating a configuration of a UE according to an embodiment of the present invention.

FIG. 11 is a block diagram illustrating a configuration of a UE according to an embodiment of the present invention.

Referring to FIG. 11, the UE includes a transceiver 1100, a multiplexer/demultiplexer 1105, an upper layer entity 1110, a control message processor 1115, and a controller 1120. The transceiver may include a reception unit for receiving signals from an eNB and a transmitter for transmitting signals to the eNB. In the case of transmitting control signals and/or data to the eNB, the UE multiplexes the controls signals and/or data by means of the multiplexer/demultiplexer 1105 and transmits the multiplexed signal by means of the transceiver 1100 under the control of the controller 1120. In the case of receiving signals, the UE receives a physical signal by means of the transceiver 1100, demultiplexes the received signal by means of the multiplexer/demultiplexer 1105, and delivers the demultiplexed information to the upper layer entity 1110 and/or control message processor 1115, under the control of the controller 1120.

Figure 12:
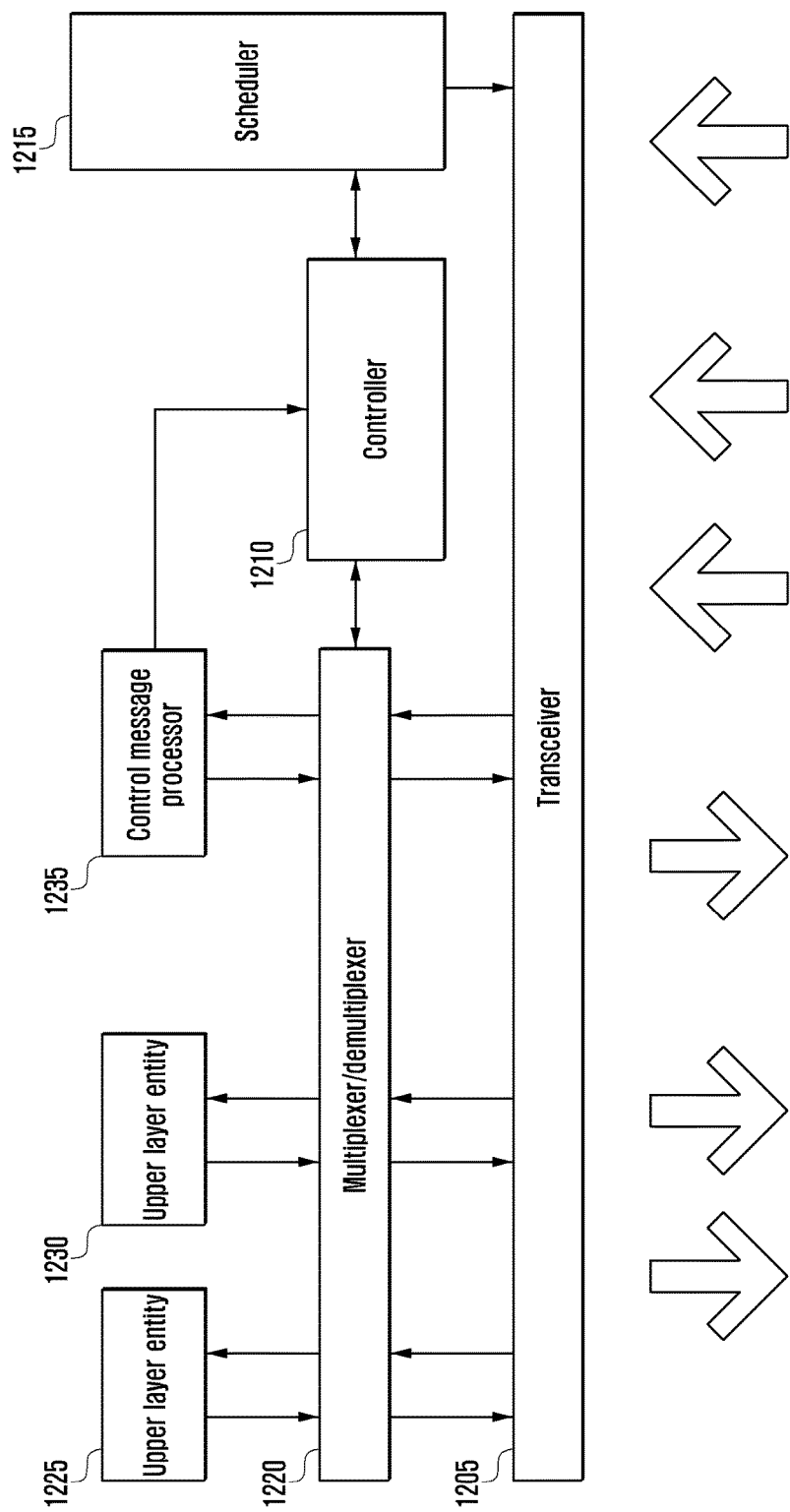
FIG. 12 is a block diagram illustrating a configuration of an eNB according to an embodiment of the present invention.

FIG. 12 is a block diagram illustrating a configuration of an eNB according to an embodiment of the present invention.

Referring to FIG. 12, the eNB includes a transceiver 1205, a controller 1210, a multiplexer/demultiplexer 1220, a control message processor 1235, upper layer entities 1225 and 1230, and a scheduler 1215. The transceiver 1205 may include a transmitter for transmitting signals to a UE and a reception unit for receiving signals from the UE. The transceiver 1205 transmits data and control signals through a downlink carrier and receives data and predetermined control signals through an uplink carrier. In the case that multiple carriers are configured, the transceiver 1205 transmits/receives the data and control signals through the multiple carriers. The multiplexer/demultiplexer 1220 multiplexes the data generated by the upper layer entities 1225 and 1230 and the control message processor 1235 or demultiplexes the data received by the transceiver 1205, the demultiplexed data being delivered to the upper layer entities 1225 and 1230, the control message processor 1235, and the controller 1210 appropriately.

Figure 13:
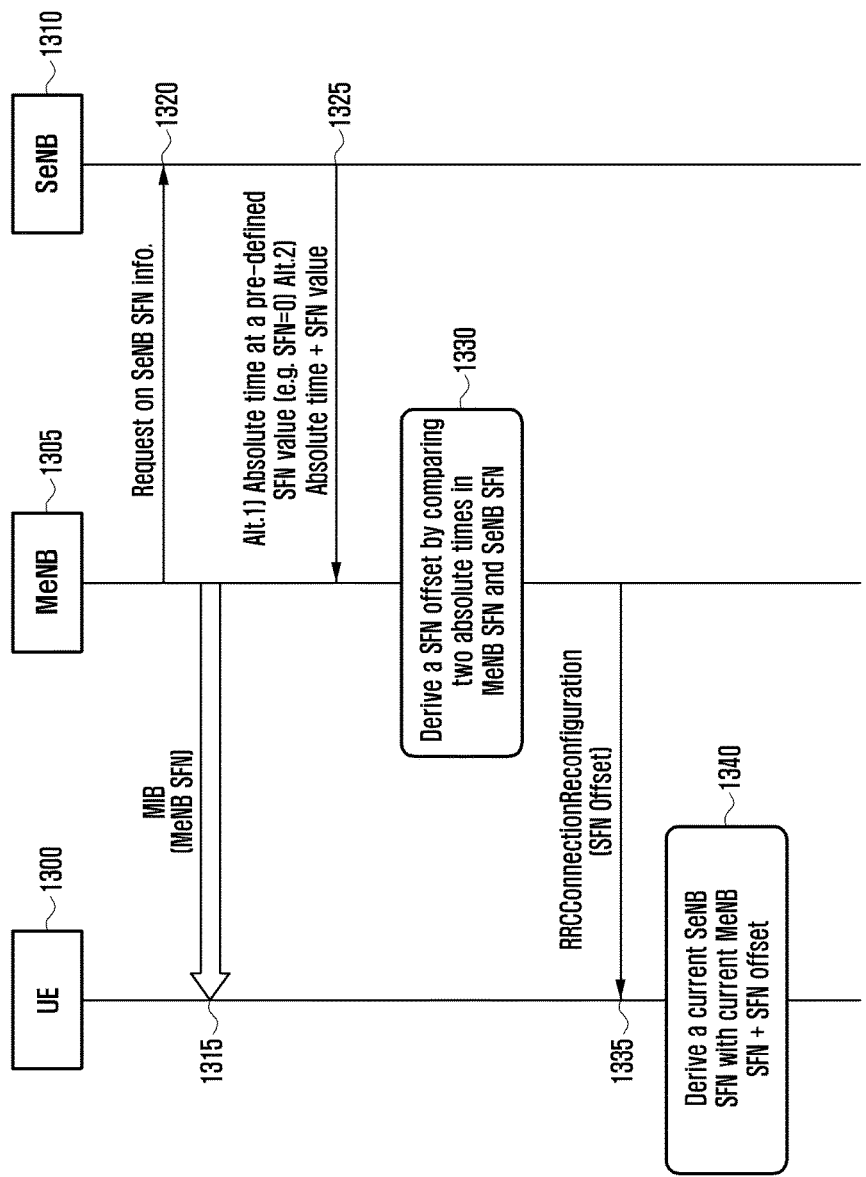
FIG. 13 is a signal flow diagram illustrating a procedure of providing a UE with an SFN offset value.

FIG. 13 is a signal flow diagram illustrating a procedure of providing a UE with an SFN offset value.

Referring to FIG. 13, the UE 1300 receives the MIB information broadcast by the MeNB 1305 at step 1315. The MIB includes the SFN information to be applied to the MeNB 1305 (hereinafter, referred to as MeNB SFN).

The MeNB 1305 may request the SeNB 1310 for the SFN information to be applied to the SeNB 1310 (hereinafter, referred to as SeNB SFN). According to some embodiments, the SeNB 1310 may be the eNB of an SCell belonging to an SCG. In order to provide the UE 1300 with the SFN offset information, the MeNB 1305 has to receive the SeNB SFN from the SeNB 1310. Step 1320 may be performed for this purpose.

The SeNB 1310 may provide the MeNB 1305 with the SeNB SFN information periodically or when a predetermined event occurs. The SeNB SFN information may be included in the SeNB configuration information which is transmitted when the MeNB 1305 configures an SCell of the SeNB first to the UE 1300. The SeNB 1310 may send the MeNB 1305 the SeNB SFN information through the X2 interface. The X2 interface is the interface for use in exchanging information between eNBs in the LTE system. The SeNB SFN information includes an absolute time value for the case of the predefined SFN value or a predetermined SFN value and the absolute time value corresponding thereto. For example, the predefined SFN value may be the last SFN=0. Here, the absolute time value denotes the absolute time at the start, middle, or end of the radio frame indicated by the predefined SFN. The small cell eNB 1310 may provide the MeNB 1305 with a predetermined SFN value and the absolute time value of the start, middle, or end of the radio frame corresponding to the SFN value. In this case, the SeNB 1310 has to signal a predetermined SFN value in addition.

The MeNB 1305 derives the SFN offset value using the SeNB SFN information provided by the SeNB 1310 at step 1330. Detailed description of the offset value derivation procedure is made with reference to FIG. 14. The MeNB 1305 compares the absolute time values corresponding to the MeNB SFN and SeNB SFN to derive the SFN offset value.

The MeNB 1305 sends the UE 1300 the SFN offset value using a predetermined RRC message at step 1335. At this time, the Information Element (IE) indicating the SFN offset value included in the RRC message may be equal to or shorter than 10 bits.

The UE 1300 adds the SFN offset value to the current MeNB SFN value to derive the SeNB SFN value at step 1340. According to some embodiments, step 1340 may include steps 340 and 345 of FIG. 3. According to some embodiments, the RRC message of step 330 of FIG. 3 may be the message transmitted at step 1335.

Figure 14:
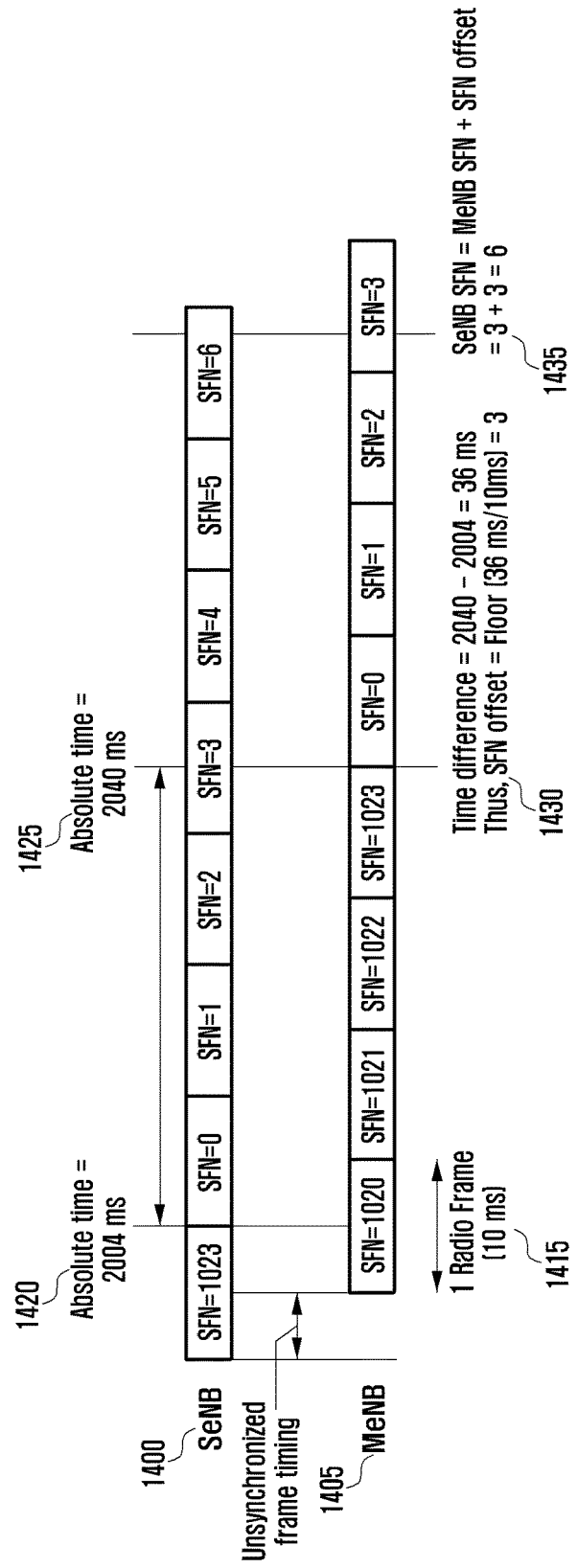
FIG. 14 is a diagram for explaining a method of deriving an SFN offset value.

FIG. 14 is a diagram for explaining a method of deriving an SFN offset value.

The embodiment of FIG. 14 is characterized in that an SeNB 1400 includes the absolute time of the start, middle, or end of the radio frame indicated by a predetermined SeNB SFN in the information provided to an MeNB 1405. The MeNB 1405 derives the SFN offset value using the difference between the absolute time of a predetermined SeNB SFN and the absolute time corresponding to the MeNB SFN having the same value. The SeNB 1400 and the MeNB 1405 may be unsynchronized as much as denoted by reference number 1410. The SeNB 1400 records the absolute time 2004 ms of the start time point of the frame which the last SeNB SFN=0 indicates as denoted by reference number 1420 and transmits the recorded time to the MeNB 1405. Although this embodiment is directed to the case where the start time point is considered, it is possible to consider the absolute time of the middle or end time point of the frame.

Since the radio frame 1415 has the fixed length of 10 ms, it is possible to derive the SFN offset regardless of time point of the frame of which the absolute value is considered. The transmission timing is provided to the MeNB 1405 in response to the request from the MeNB 1405, when a predetermined event such as SeNB SCell addition occurs, or periodically. The MeNB 1405 checks the absolute time of 2040 ms 1425 of the start time point of the frame indicated by the last MeNB SFN=0. The MeNB 1405 calculates the difference between the absolute time of 2004 ms provided by the SeNB 1410 and the time 2040 and derives the SFN offset value considering the SFN unit (10 ms) as denoted by reference number 1430. As a consequence, the MeNB SFN and SeNB SFN have an SFN difference as much as 3. The SFN offset value is transmitted to the UE through an RRC message. In this case, if the current MeNB SFN is 3, the SeNB SFN becomes 6.

Figure 15:
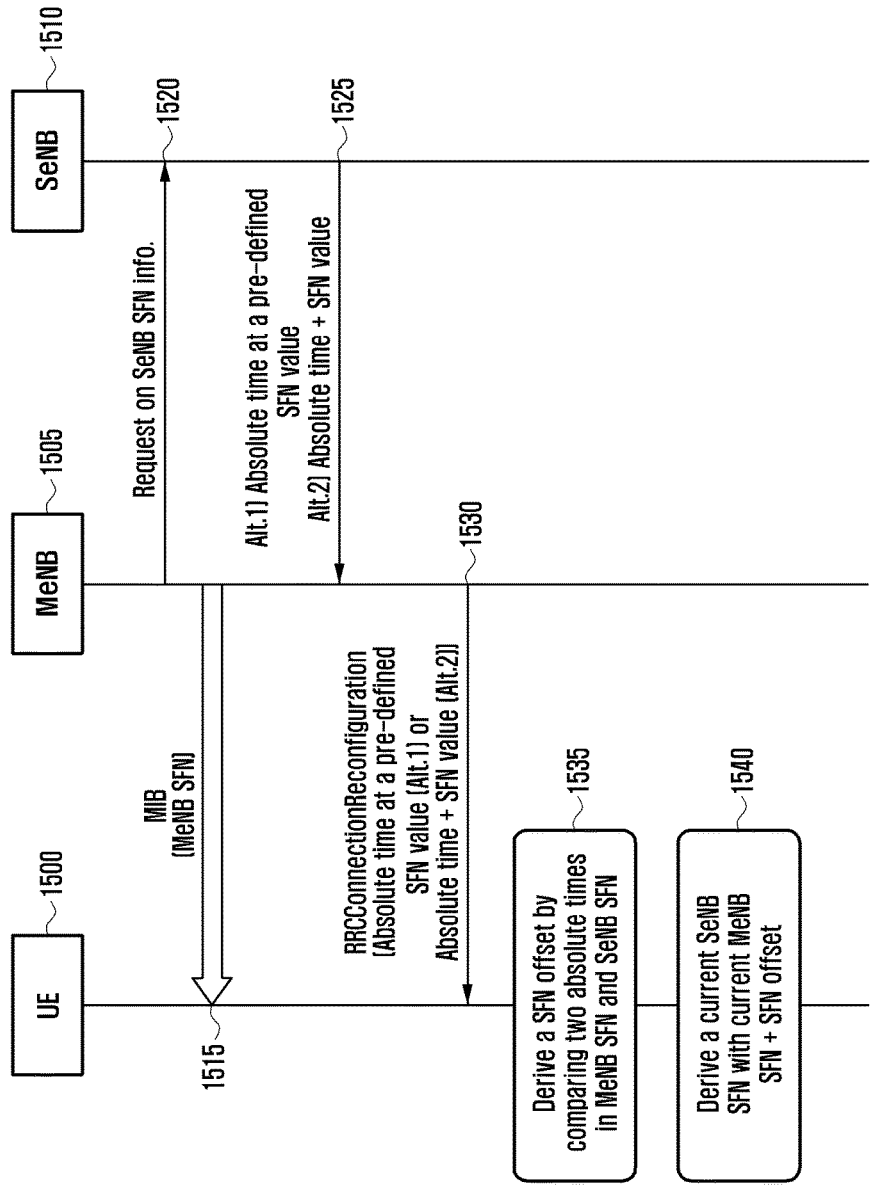
FIG. 15 is a signal flow diagram illustrating a procedure for a UE to provide the information for use in deriving the SFN offset information for itself.

FIG. 15 is a signal flow diagram illustrating a procedure for a UE to provide the information for use in deriving the SFN offset information for itself.

Steps 1515 to 1525 of FIG. 15 correspond to steps 1315 to 1325 of FIG. 13. Thus detailed descriptions of steps 1515 to 1525 are omitted herein. After then, however, the MeNB 1505 forwards the information received from the SeNB 1510 to the UE 1500 at step 1530 other than that it derives the SFN offset value and transmits the SFN offset value to the UE 1500.

At step 1535, the UE 1500 performs the operation which the MeNB 1505 performs at step 1330 of FIG. 13. The UE 1500 has to know the absolute time corresponding to the MeNB SFN having the same value as the absolute time of the received SeNB SFN. This information may be acquired considering the reception time of the MIB including the MeNB SFN information. That is, if the absolute time when the MIB including the information indicating SFN=0 is acquired is 0 ms, the absolute time of SFN=3 is 30 ms. The UE 1500 adds the SFN offset value to the current MeNB SFN value to derive the SeNB SFN value at step 1540. The UE 1500 may perform PUCCH transmission and/or DRX operation by applying the acquired SeNB SFN information.

According to some embodiment, the UE may perform steps 300 to 345 of FIG. 3. The RRC message received at step 330 of FIG. 3 may include the SeNB SFN information transmitted at step 1530 instead of the SFN offset value, and steps 340 of FIG. 3 may be substituted by steps 1535 and 1540.

The SeNB SFN information may be provided by an O&M server as well as the SeNB 1510. Typically, the O&M server may store various informations about eNBs. Such informations may include SeNB SFN timing information.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to functions thereof.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for the components and modules may be combined into fewer components and modules or further separated into additional components and modules. In addition, the components and modules may be implemented such that they execute one or more CPUs in a device or a secure multimedia card.

It is to be appreciated that those skilled in the art can change or modify the embodiments without departing from the technical concept of this invention. Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method by a terminal in a wireless communication system, the method comprising:
   receiving, from a first base station, a dedicated radio resource control (RRC) message for adding at least one secondary cell of a second base station;
   receiving, on a primary secondary cell (PSCell) of the second base station, master information;
   identifying a system frame number (SFN) based on the received master information; and
   applying the identified SFN to communicate with the at least one secondary cell of the second base station, wherein the dedicated RRC message includes information for the at least one secondary cell except for the SFN.

2. The method of claim 1, wherein the PSCell is configured with a physical uplink control channel (PUCCH) resource.

3. The method of claim 1,
wherein a master cell group (MCG) is controlled by the first base station, and
wherein a secondary cell group (SCG) is controlled by the second base station.

4. The method of claim 1, wherein a timing of the SFN associated with the at least one secondary cell of the second base station is different from a time of an SFN associated with at least one cell of the first base station.

5. A method by a second base station in a wireless communication system, the method comprising:
determining to add at least one secondary cell including a primary secondary cell (PSCell) having a physical uplink control channel (PUCCH) resource, of the second base station; and
transmitting, on the PSCell to a terminal which is connected to a first base station by a first cell, master information including a system frame number (SFN) which is applied to communicate with the at least one secondary cell of the second base station,
wherein a dedicated radio resource control (RRC) message which is transmitted from the first base station to the terminal for adding the at least one secondary cell to the terminal includes information for the at least one secondary cell except for the SFN.

6. The method of claim 5,
wherein a secondary cell group (SCG) is controlled by the second base station, and
wherein a master cell group (MCG) is controlled by the first base station.

7. The method of claim 5, wherein a timing of the SFN associated with the at least one secondary cell of the second base station is different from a time of an SFN associated with at least one cell of the first base station.

8. A method by a first base station in a wireless communication system, the method comprising:
determining to add at least one secondary cell of a second base station to a terminal which is connected to a first cell of the first base station; and
transmitting, to the terminal, a dedicated radio resource control (RRC) message for adding the at least one secondary cell of the second base station, wherein the dedicated RRC message includes information for the at least one secondary cell except for a system frame number (SFN),
wherein the SFN which is applied to the at least one secondary cell of the second base station is transmitted to the terminal on a primary secondary cell (PSCell) of the second base station.

9. The method of claim 8, wherein the PSCell is configured with a physical uplink control channel (PUCCH) resource.

10. The method of claim 8,
wherein a master cell group (MCG) is controlled by the first base station, and
wherein a secondary cell group (SCG) is controlled by the second base station.

11. The method of claim 8, wherein a timing of the SFN associated with the at least one secondary cell of the second base station is different from a time of an SFN associated with at least one cell of the first base station.

12. A terminal in a wireless communication system, the terminal comprising:
a transceiver; and
a controller coupled with the transceiver and configured to control to:
receive, from a first base station, a dedicated radio resource control (RRC) message for adding at least one secondary cell of a second base station,
receive, on a primary secondary cell (PSCell) of the second base station, master information,
identify a system frame number (SFN) based on the master information, and
apply the identified SFN to communicate with the at least one secondary cell of the second base station,
wherein the dedicated RRC message includes information for the at least one secondary cell except for the SFN.

13. The terminal of claim 12, wherein the PSCell is configured with a physical uplink control channel (PUCCH) resource.

14. The terminal of claim 12,
wherein a master cell group (MCG) is controlled by the first base station, and
wherein a secondary cell group (SCG) is controlled by the second base station.

15. The terminal of claim 12, wherein a timing of the SFN associated with the at least one secondary cell of the second base station is different from a time of an SFN associated with at least one cell of the first base station.

16. A second base station in a wireless communication system, the second base station comprising:
a transceiver; and
a controller coupled with the transceiver and configured to control to:
determine to add at least one secondary cell including a primary secondary cell (PSCell) having a physical uplink control channel (PUCCH) resource, of the second base station, and
transmit, on the PSCell to a terminal which is connected to a first base station by a first cell, master information including a system frame number (SFN) which is applied to communicate with the at least one secondary cell of the second base station,
wherein a dedicated radio resource control (RRC) message which is transmitted from the first base station to the terminal for adding the at least one secondary cell to the terminal includes information for the at least one secondary cell except for the SFN.

17. The second base station of claim 16,
wherein a secondary cell group (SCG) is controlled by the second base station, and
wherein a master cell group (MCG) is controlled by the first base station.

18. The second base station of claim 16, wherein a timing of the SFN associated with the at least one secondary cell of the second base station is different from a time of an SFN associated with at least one cell of the first base station.

19. A first base station in a wireless communication system, the base station comprising:
a transceiver; and
a controller coupled with the transceiver and configured to control to:
determine to add at least one secondary cell of a second base station to a terminal which is connected to a first cell of the first base station, and
transmit, to the terminal, a dedicated radio resource control (RRC) message for adding the at least one secondary cell of the second base station, wherein the dedicated RRC message includes information for the at least one secondary cell except for a system frame number (SFN), and wherein the SFN which is applied to the at least one secondary cell of the second base station is transmitted to the terminal on a primary secondary cell (PSCell) of the second base station.

20. The first base station of claim 19, wherein the PSCell is configured with a physical uplink control channel (PUCCH) resource.

21. The first base station of claim 19, wherein a master cell group (MCG) is controlled by the first base station, and a secondary cell group (SCG) is controlled by the second base station.

22. The first base station of claim 19, wherein a timing of the SFN associated with the at least one secondary cell of the second base station is different from a time of an SFN associated with at least one cell of the first base station.

* * * * *